United States Patent
Murata

(10) Patent No.: US 8,272,750 B2
(45) Date of Patent: Sep. 25, 2012

(54) PROJECTION-TYPE IMAGE DISPLAY APPARATUS

(75) Inventor: Taisuke Murata, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 341 days.

(21) Appl. No.: 12/501,119

(22) Filed: Jul. 10, 2009

(65) Prior Publication Data

US 2010/0007855 A1 Jan. 14, 2010

(30) Foreign Application Priority Data

Jul. 11, 2008 (JP) ................................. 2008-181588

(51) Int. Cl.
*G03B 21/20* (2006.01)
*G03H 1/02* (2006.01)
*H01J 40/14* (2006.01)

(52) U.S. Cl. .............................. 353/85; 359/28; 250/239

(58) Field of Classification Search .............. 353/29–31, 353/85, 94, 98; 250/205, 226, 239, 552, 250/553; 73/1.56; 359/28

See application file for complete search history.

(56) References Cited

U.S. PATENT DOCUMENTS

| 7,434,939 B2 | 10/2008 | Tajiri |
| 7,570,404 B2* | 8/2009 | Li et al. ........................... 359/15 |
| 7,665,851 B2* | 2/2010 | Iwanaga ........................... 353/84 |
| 7,924,368 B2* | 4/2011 | Fabick et al. .................... 349/64 |

FOREIGN PATENT DOCUMENTS

| JP | 2004-163527 A | 6/2004 |
| JP | 2004-207420 A | 7/2004 |
| JP | 2005-331906 A | 12/2005 |
| JP | 2008-003270 A | 1/2008 |

* cited by examiner

*Primary Examiner* — Georgia Y Epps
*Assistant Examiner* — Don Williams
(74) *Attorney, Agent, or Firm* — Birch, Stewart, Kolasch & Birch, LLP

(57) ABSTRACT

A projection-type image display apparatus that projects an image onto a screen and includes a laser light source, an optical engine, a projection lens, and a control unit. The laser light source includes a plurality of light source units that respectively emit laser beams of different wavelengths. The optical engine combines the laser beams received from the light source and forms an image. An optical sensor is arranged in the optical engine to detect a physical property of a uniformly-scattered laser beam and outputs a physical property signal indicative of the detected physical property to the control unit. The control unit controls output powers of the light source units based on the physical property signal.

8 Claims, 2 Drawing Sheets

PROJECTION-TYPE IMAGE DISPLAY APPARATUS

BACKGROUND OF THE INVENTION

1. Field of the Invention

The present invention relates to a projection-type image display apparatus.

2. Description of the Related Art

A white light source, such as a mercury vapor lamp, is used as a light source in conventional projection-type image display apparatus. To create a full-color image by using a white light emitted from a white light source, it is necessary to separate the white light into different color components, such as red, green, and blue light components by using an optical color separation filter. In recent years, however, a plurality of single-color semiconductor lasers is used in place of a white light source. Use of the plurality of single-color semiconductor lasers enables formation of a full-color image without using an optical color separation filter.

However, when a plurality of single-color lasers are used, an output light intensity of a laser beam emitted from each of the single-color semiconductor lasers can be non-uniform. Moreover, a temporal change of the output light intensity can be non-uniform. To obtain a uniform output from each of the plurality of single-color lasers, it is necessary to perform output control of the single-color semiconductor lasers. However, because this control is typically performed based on light intensities or chromaticities of the laser beams, it is necessary to detect the light intensities or chromaticities.

Japanese Patent Application Laid-open No. 2005-331906 discloses a detecting device that detects a light intensity of a projected image. The projected image is created by using a combined light obtained by combining a plurality of laser light sources and directing the combined light onto an image plane. In this way, the detecting device detects light intensity distribution on the image plane. Subsequently, the laser light sources and an optical system are adjusted based on the detected light intensity distribution. In this manner, the non-uniformity of light intensities of the projected image can be suppressed.

To create an image having a desired chromaticity, or a desired light intensity, it is necessary to detect a chromaticity, or a light intensity, of the combined light in which each component is combined uniformly. However, the detecting device disclosed in Japanese Patent Application Laid-open No. 2005-331906 cannot necessarily detect a combined light in which each component is combined uniformly; because, the detecting device detects a light intensity of the projected image. It may happen that the detecting device detects a combined light having only a color component corresponding to a certain laser light source. Therefore, there is a possibility that the light intensity cannot be detected accurately.

The output power of each laser light source gradually changes with time and each laser light source has a different change ratio. Therefore, a ratio of light intensities of laser beams emitted from the laser light sources varies with time. This can lead to create a projected image of which white balance is not constant. Furthermore, it is not possible to detect whether light emitted from a laser light source has been blocked or is leaking out of its optical path when a failure occurs on a component in the projection-type image display apparatus.

SUMMARY OF THE INVENTION

It is an object of the present invention to at least partially solve the problems in the conventional technology.

According to an aspect of the present invention, there is provided a projection-type image display apparatus including a laser light source that includes a plurality of light source units each of which emits a laser beam of a unique wavelength; an optical engine that combines the laser beams thereby generating a combined laser beam indicative of an image, the optical engine including therein an optical sensor that detects a physical property of each of the laser beams and outputs a physical property signal indicative of detected physical property; a projection unit that magnifies the combined laser beam and projects a magnified laser beam onto a screen; and a control unit that controls at least one of the light source units based on the physical property signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
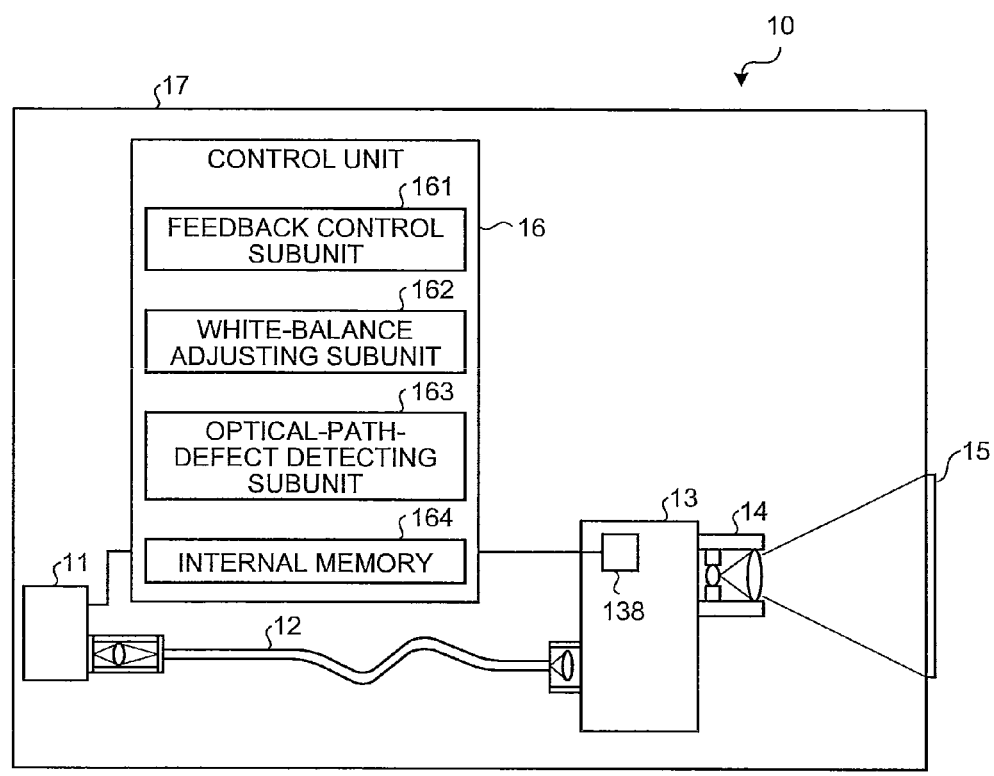
FIG. 1 is a schematic diagram of an exemplary configuration of a projection-type image display apparatus according to a first embodiment of the present invention.

FIG. 1 is a schematic diagram of an exemplary configuration of a projection-type image display apparatus 10 according to a first embodiment of the present invention. The projection-type image display apparatus 10 includes a laser light source 11, an optical fiber cable 12, an optical engine 13, a projection lens 14, a screen 15, a control unit 16, and a casing 17. The laser light source 11, the optical fibers 12, the optical engine 13, the projection lens 14, the screen 15, and the control unit 16 are arranged in or on the casing 17 and supported by and fixed to the casing 17.

The laser light source 11 includes a plurality of light source units (not shown), such as semiconductor lasers, that emit laser beams of different wavelengths. The laser light source 11 includes three light source units: a red source unit that emits a red laser beam, a green source unit that emits a green laser beam, and a blue source unit that emits a blue laser beam. The number of light source units is not limited to three, it can be more than three or less than three.

Each light source unit includes a laser emitter and an optical coupling system. The laser emitter emits a laser beam of the corresponding color and the optical coupling system focuses the laser beam onto an optical spot thereof. The optical spot is positioned at an input terminal of the optical fiber cable 12 for efficient transmission of optical energy from the light source unit to the optical fiber cable 12.

The optical fiber cable 12 includes a plurality of optical fibers. Each optical fiber corresponds to one of the light source units. The optical fibers are tied together into a bundle on the way. Therefore, the optical fiber cable 12 is coupled to the optical engine 13 through a single output terminal to form an optical path. Laser beams emitted from the laser light source 11 are transmitted through the optical path to the optical engine 13.

The optical engine 13 is provided at the output terminal of the bundled optical fiber cable 12. The optical engine 13 includes various optical components as described below. The optical engine 13 makes the light intensities of laser beams emitted from the laser light source 11 uniform with these optical components. An optical sensor 138 is provided inside the optical engine 13 to detect a physical property of each color laser beam emitted from the laser light source 11 and outputs a physical property signal indicative of the detected physical property. The physical property can be a chromaticity or a light intensity.

The projection lens 14 magnifies and projects the light emitted from the optical engine 13. The screen 15 receives the magnified light and displays thereon a corresponding image.

The control unit 16 includes a feedback control subunit 161, a white-balance adjusting subunit 162, an optical-path-defect detecting subunit 163, and an internal memory 164. The feedback control subunit 161 performs feedback control of output power of the laser light source 11 based on the physical property signal output from the optical sensor 138. This feedback control is performed on the light source units.

The white-balance adjusting subunit 162 detects how much an output ratio between powers of the light source units of the laser light source 11 deviates from a predetermined output ratio (hereinafter, "white-balance-adjustment value"). The white-balance-adjustment value is set in advance. The white-balance adjusting subunit 162 then controls the output power of each light source unit so that the output ratio attains the white-balance-adjustment value. The white-balance adjusting subunit 162 performs this white balance adjustment by comparing the white-balance-adjustment value to the physical property detected at the optical sensor 138.

The white-balance-adjustment value will be described more specifically by way of an example below. When the chromaticity of a reference white image is determined in advance, the output ratio between the red, green, and blue light source units of the laser light source 11 is automatically determined. Therefore, a physical property detected at the optical sensor 138 when the light source units output their powers to be the output ratio automatically determined can be used as the white-balance-adjustment value.

The optical-path-defect detecting subunit 163 monitors the optical path from the laser light source 11 to the optical engine 13 to find out a defect, such as the attenuation or cutoff of light, based on the physical property signal output from the optical sensor 138. Upon detection of the defect, the optical-path-defect detecting subunit 163 powers off the laser light source 11. The optical-path-defect detecting subunit 163 performs this defect detection by comparing a predetermined value (hereinafter, "optical-path-defect detection value") to the physical property detected at the optical sensor 138. To compute the optical-path-defect detection value, the optical sensor 138 detects the light intensity of the laser beam, for example, when the projection-type image display apparatus 10 is normally actuated in a default situation. After that, the optical-path-defect detection value can be obtained by multiplying a certain value by the detected light intensity.

The control unit 16 includes the internal memory 164 for storing therein the white-balance-adjustment values and the optical-path-defect detection value. The control unit 16 reads/writes data from/into the internal memory 164 when required.

Figure 2:
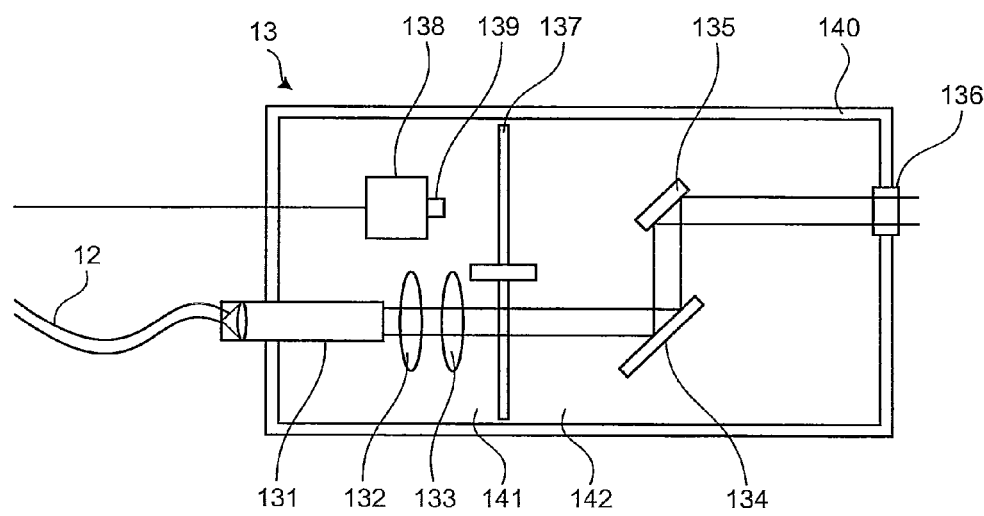
FIG. 2 is a schematic diagram of an internal structure of an optical engine shown in FIG. 1.

FIG. 2 is a schematic diagram of an internal structure of the optical engine 13. The optical engine 13 includes a light inputting unit 131, lenses 132 and 133, a reflection mirror 134, a display device 135, a light outputting unit 136, a diffuser plate 137, the optical sensor 138, and a housing 140. These components of the optical engine 13 are arranged in the optical engine housing 140 and supported by and fixed to the optical engine housing 140.

The light inputting unit 131 receives the laser beam via the optical fiber cable 12. The light inputting unit 131 uniforms each color component of the laser beam emitted from the light source units of the laser light source 11. The lenses 132 and 133 are arranged between the light inputting unit 131 and the reflection mirror 134, and they converge the uniformed laser beam and illuminate the display device 135 by using the converged laser beam. The reflection mirror 134 directs the laser beam output from the lenses 132 and 133 to the display device 135.

The display device 135 forms an image by using the laser beam reflected from the reflection mirror 134. The display device 135 can be a digital micro-mirror device (DMD), a liquid crystal display device, or the like. The display device 135 is smaller than the screen 15. The light outputting unit 136 outputs the image output from the display device 135 outside the optical engine 13.

The diffuser plate 137 is provided on the optical path between the lens 133 and the reflection mirror 134. The diffuser plate 137 diffuses a portion of the laser beam that has passed through the lenses 132 and 133 and transmits the remaining portion of the laser beam to the reflection mirror 134. The diffuser plate 137 further suppresses scintillation. The diffuser plate 137 is provided so that the space inside the housing 140 is partitioned into a first space 141 where the lenses 132 and 133 are arranged and a second space 142 where the reflection mirror 134 is arranged. The diffuser plate 137 scatters the portion of the laser beam that has passed through the lenses 132 and 133 and light reflected and scattered by the housing 140.

The optical sensor 138 is provided in the first space 141. The optical sensor 138 includes, at its leading end, a photodetector 139. The optical sensor 138 detects a physical property of each of red, green, and blue component of the laser beam incident on the photodetector 139, and outputs a physical property signal indicative of the detected physical property of each color component of the incident laser beam to the control unit 16.

The operation of the projection-type image display apparatus 10 will be described in detail below. Laser beams of the three colors emitted from the light source units of the laser light source 11 enter the optical engine 13 via the optical fiber cable 12. In the optical engine 13, the laser beams output from the light source units of the laser light source 11 are uniformed in the light inputting unit 131, and is incident on the diffuser plate 137 through the lenses 132 and 133. A portion of the laser beam is diffused and the remaining portion is transmitted by the diffuser plate 137. The remaining portion passing through the diffuser plate 137 is reflected from the reflection mirror 134 and then directed to the display device 135. In the display device 135, the laser beam is converted into an image. The image is output from the light outputting unit 136 to the projection lens 14. The image is magnified and projected by the projection lens 14 onto a substantially entire surface of the screen 15. Therefore, the image is displayed on the screen 15 as a display image.

The light that is projected onto the screen 15 is a conclusive display image. The projected light is a combined light obtained by combining color components emitted from the light source units of the laser light source 11. Accordingly, to estimate a physical property (a light intensity or a chromaticity) of the projected display image, it is necessary to detect the combined light by means of the optical sensor 138. Furthermore, it is effective to use uniformly-scattered light as incident light on the optical sensor 138 for accurate estimation of the light intensity and the chromaticity. The uniformly-scattered light has a combining ratio substantially the same as that of the color laser beams respectively emitted from the light source units of the laser light source 11.

According to the first embodiment, the detection of the combined light is performed by using the reflection and scattering of light that occur on the optical path in the optical engine 13 and/or on the internal surfaces of the housing 140. More specifically, the red, green, and blue laser beams emitted from the laser light source 11 are combined and input into the light inputting unit 131 of the optical engine 13 via the optical fiber cable 12. The combined light is reflected and scattered in the optical engine 13. The scattered light is incident on the photodetector 139 of the optical sensor 138 and a physical property of the scattered light is detected by the photodetector 139. Because this scattered light has a combining ratio substantially the same as that of the combined laser beam, it is possible to obtain accurate information about the physical property of the laser beams emitted from the light source units.

In the first embodiment, the optical sensor 138 is provided at the side of the laser light source 11 relative to the diffuser plate 137 to use more-uniformly-scattered light as incident light on the optical sensor 138. That is, the optical sensor 138 is provided in the first space 141. The reason for employing this configuration will be described briefly. Light is scattered by the diffuser plate 137 when the light enters the second space 142 across the diffuser plate 137. Therefore, light that moves from the second space 142 to the first space 141 is scattered at least twice by the diffuser plate 137. In this way, because the light reflected and scattered in the closed space can be scattered by the diffuser plate 137 many times, a major portion of light incident on the photodetector 139 of the optical sensor 138 provided in the first space 141 is scattered many times by the diffuser plate 137. The more the light is scattered, the more the light is uniformed. Therefore, the optical sensor 138 in the first space 141 can receive uniformly-scattered light as compared to that in the second space 142. This permits reliable detection of a change in the physical property.

The photodetector 139 of the optical sensor 138 detects the physical property of the scattered light whose major portion has been scattered many times. The optical sensor 138 then outputs a physical property signal, which represents the physical property of each color component of the scattered light incident on the photodetector 139, to the control unit 16. The feedback control subunit 161 of the control unit 16 performs feedback control of output power of each light source unit of the laser light source 11 based on the physical property signal output from the optical sensor 138. This control permits to obtain a display image of desired light intensity and chromaticity.

The white-balance adjusting subunit 162 of the control unit 16 adjusts white balance by comparing the physical properties detected by the optical sensor 138 to the components of the white-balance-adjustment value (predetermined output ratio) stored in the internal memory 164. For example, when one of the detected physical properties is greater than the corresponding component of the white-balance-adjustment value, the white-balance adjusting subunit 162 decreases the output power of the corresponding light source unit in the laser light source 11 or increases the output powers of the other light source units. In contrast, when one of the detected physical properties is smaller than the corresponding component, the white-balance adjusting subunit 162 increases the output power of the corresponding light source unit or decreases the output powers of the other light source units.

The optical-path-defect detecting subunit 163 of the control unit 16 compares a total of the physical properties detected by the optical sensor 138 to the optical-path-defect detection value stored in the internal memory 164, and determines whether the optical path has a defect. When the total is equal to or larger than the optical-path-defect detection value, the optical-path-defect detecting subunit 163 determines that the optical path has no defect and causes the laser light source 11 to emit the light beams. In contrast, when the total is smaller than the optical-path-defect detection value, the optical-path-defect detecting subunit 163 determines that the optical path has a defect. More specifically, the optical-path-defect detecting subunit 163 determines that light emitted from the laser light source 11 has failed to enter the optical engine 13 accurately due to a leakage or a cutoff of light in the optical path. Upon detection of such a defect, the optical-path-defect detecting subunit 163 powers off the laser light source 11 for securing safety.

In the projection-type image display apparatus 10, the optical sensor 138 is provided in the first space 141. Therefore, because a combined light having a plurality of color components emitted from the laser light source 11 is confined in the first space 141 and is received by the optical sensor 138, feedback control of output power of the laser light source 11 can be performed based on physical properties (chromaticities or light intensities) of the combined light output from the optical sensor 138. This approach is advantageous in that a display image of a desired physical property can be projected on the screen 15. This approach is further advantageous in that a physical property of a display image can be maintained even when the output power of the laser light source 11 decreases with time. Furthermore, by detecting attenuation in the physical property, it is also possible to detect a defective condition, such as the leakage or cutoff of the light, on the optical path between the laser light source 11 and the projection lens 14. This is advantageous in increasing the level of safety of the product.

Moreover, the optical sensor 138 is provided out of an optical path of an illuminating optical system in the optical engine 13. Therefore, the optical sensor 138 constantly receives uniformly-scattered light, and a malfunction caused by the fact that only light of a specific wavelength directly enters the optical sensor 138 is prevented. Moreover, because the optical sensor 138 is provided in the first space 141 near the laser light source 11, light reflected in the second space 142 near the projection lens 14 is scattered by the diffuser plate 137 many times and reaches the first space 141. As a result, the photodetector 139 of the optical sensor 138 can receive more-uniformly-scattered light and thus the optical sensor 138 can reliably detect the change in the physical property.

Figure 3:
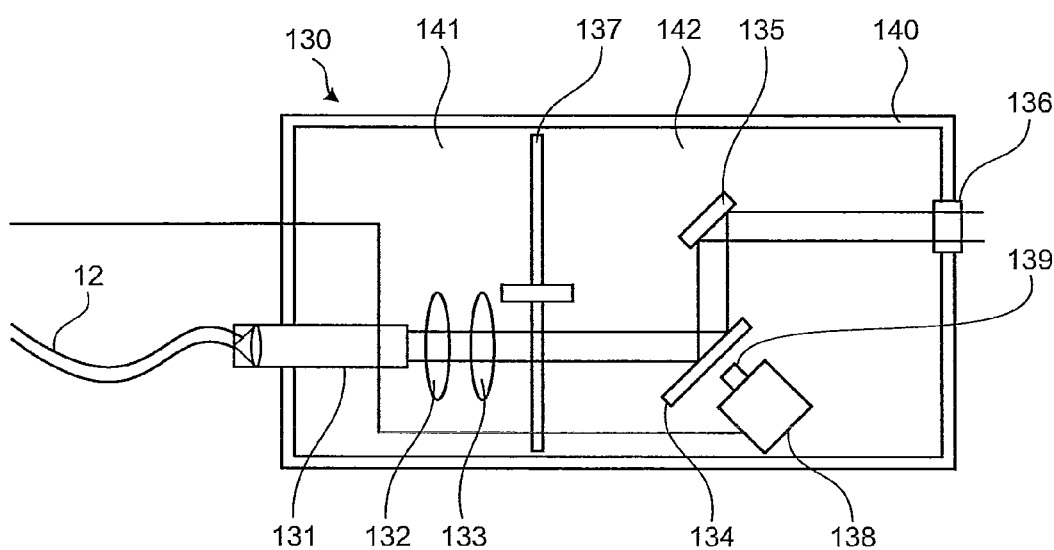
FIG. 3 is a schematic diagram of an internal structure of an optical engine according to a second embodiment of the present invention.

FIG. 3 is a schematic diagram of an optical engine 130 according to a second embodiment of the present invention. The optical engine 130 can be used in the projection-type image display apparatus 10 in place of the optical engine 13. While the optical sensor 138 is provided in the first space 141 in the optical engine 13, the optical sensor 138 is provided in the second space 142 and at the rear of the reflection mirror 134 in the optical engine 130. The same components as those of the first embodiment are denoted by the same reference numerals as those of the first embodiment and repeated descriptions are avoided.

When such a configuration is employed, a light reflected from the surfaces of the lenses 132 and 133 or the surface of the reflection mirror 134 cannot enter the photodetector 139 of the optical sensor 138.

Because the optical sensor 138 is provided at the rear of the reflection mirror 134, the second embodiment has an effect that light reflected from the surfaces of the lenses 132 and 133 or the surface of the reflection mirror 134 is prevented from entering the optical sensor 138, in addition to the effect of the first embodiment.

According to an aspect of the present invention, it is possible to project an image having a desired light intensity and a desired chromaticity onto a screen. In addition, it is possible to maintain the light intensity and the chromaticity of the projected image even when output power of a laser light source changes with time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type image display apparatus comprising:
   a laser light source that includes a plurality of light source units each of which emits a laser beam of a unique wavelength;
   an optical engine that combines the laser beams thereby generating a combined laser beam indicative of an image, the optical engine including therein an optical sensor that detects a physical property of each of the laser beams and outputs a physical property signal indicative of detected physical property;
   a projection unit that magnifies the combined laser beam and projects a magnified laser beam onto a screen; and
   a control unit that controls at least one of the light source units based on the physical property signal.

2. The projection-type image display apparatus according to claim 1, wherein the optical sensor is arranged at a position where a light scattering in the optical engine becomes uniform.

3. The projection-type image display apparatus according to claim 1, wherein the optical engine further includes optical components;
   a housing that houses the optical engine and holds the components; and
   a diffuser plate that is provided to partition a space inside the housing into a first space near the laser light source and a second space near the projection unit, and
   the optical sensor is arranged in the first space.

4. The projection-type image display apparatus according to claim 1, wherein the optical engine includes
   a converging unit that converges the laser beam emitted by the laser light source;
   a reflection unit that receives the laser beam that has passed through the converging unit and reflects the laser beam;
   a display device that forms an image using the laser beam reflected from the reflection unit and directs the image toward the projection unit; and
   a diffuser plate that is provided between the converging unit and the reflection unit so as to partition a space inside the optical engine into a first space near the laser light source and a second space near the projection unit, and
   the optical sensor is arranged in the second space and near a back surface, that is opposite to a reflection surface, of the reflection unit.

5. The projection-type image display apparatus according to claim 1, wherein the control unit controls at least one of the light source units such that a physical property ratio of color components corresponding to the light source units, which is obtained from the physical property signal, is identical with a physical property ratio on a reference white image.

6. The projection-type image display apparatus according to claim 1, wherein when the physical property signal indicates that the physical property of the laser light source is smaller than a predetermined value, the control unit powers off the light source unit.

7. The projection-type image display apparatus according to claim 1, wherein the physical property signal indicates light intensity of each of the laser beams.

8. The projection-type image display apparatus according to claim 1, wherein the physical property signal indicates chromaticity of each of the laser beams.

* * * * *